(12) United States Patent  
Glugla et al.

(10) Patent No.: US 9,133,757 B2  
(45) Date of Patent: Sep. 15, 2015

(54) ENGINE CONTROL SYSTEM AND METHOD

(71) Applicant: Ford Global Technologies, LLC, Dearborn, MI (US)

(72) Inventors: Chris Paul Glugla, Macomb, MI (US); Joseph Patrick Whitehead, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 13/648,784

(22) Filed: Oct. 10, 2012

(65) Prior Publication Data

US 2014/0100758 A1   Apr. 10, 2014

(51) Int. Cl.

| F02B 33/44 | (2006.01) |
|---|---|
| F02B 29/04 | (2006.01) |
| F02D 23/00 | (2006.01) |
| F02M 25/028 | (2006.01) |
| F02D 41/12 | (2006.01) |
| F02D 41/00 | (2006.01) |
| F02M 25/07 | (2006.01) |

(52) U.S. Cl.
CPC ......... *F02B 29/0418* (2013.01); *F02B 29/0468* (2013.01); *F02D 23/00* (2013.01); *F02D 41/0005* (2013.01); *F02D 41/123* (2013.01); *F02M 25/028* (2013.01); *F02B 29/0425* (2013.01); *F02D 2200/0418* (2013.01); *F02M 25/0707* (2013.01); *Y02T 10/144* (2013.01); *Y02T 10/146* (2013.01); *Y02T 10/42* (2013.01)

(58) Field of Classification Search
CPC ............. F02B 29/0418; F02B 29/0425; F02B 29/0468; F02D 2200/0418; F02D 23/00; F02D 41/0005; F02D 41/123; F02M 25/028; F02M 25/0707; Y02T 10/144; Y02T 10/146; Y02T 10/42

See application file for complete search history.

(56) References Cited

U.S. PATENT DOCUMENTS

| 6,728,625 | B2 * | 4/2004 | Strubhar et al. ............... 701/104 |
|---|---|---|---|
| 6,748,475 | B1 | 6/2004 | Sørenson |
| 6,948,475 | B1 | 9/2005 | Wong et al. |
| 7,150,264 | B2 | 12/2006 | Kobayashi et al. |
| 2005/0193978 | A1 | 9/2005 | Ishikawa |
| 2007/0107425 | A1 * | 5/2007 | Appleton ........................ 60/599 |
| 2007/0277792 | A1 * | 12/2007 | Durand .......................... 123/563 |
| 2009/0013977 | A1 * | 1/2009 | Brecheisen, II ............... 123/563 |

(Continued)

FOREIGN PATENT DOCUMENTS

| EP | 1607606 A1 | 12/2005 |
|---|---|---|
| WO | 2004004406 A1 | 1/2004 |
| WO | WO 2012057189 A1 * | 5/2012 .............. F02D 23/00 |

OTHER PUBLICATIONS

Glugla, Chris Paul et al., "Method for Purging Condensate from a Charge Air Cooler," U.S. Appl. No. 13/656,511, filed Oct. 19, 2012, 48 pages.

*Primary Examiner* — Jesse Bogue (74) *Attorney, Agent, or Firm* — Julia Voutyras; Alleman Hall McCoy Russell & Tuttle LLP (57) ABSTRACT

Methods and systems are provided for purging condensate from a charge air cooler to an engine intake. During an engine deceleration event, airflow through a charge air cooler is temporarily increased to purge stored condensate to the engine intake. By delivering condensate while an engine is not fueled, misfire events resulting from ingestion of water are reduced.

15 Claims, 7 Drawing Sheets

(56) References Cited

U.S. PATENT DOCUMENTS

| | | |
|---|---|---|
| 2009/0050117 A1* | 2/2009 | Tai et al. .................... 123/542 |
| 2009/0223493 A1 | 9/2009 | Rutherford |
| 2010/0077995 A1 | 4/2010 | Buia et al. |
| 2011/0072793 A1 | 3/2011 | Bidner et al. |
| 2011/0094219 A1* | 4/2011 | Palm ............................ 60/599 |
| 2011/0184632 A1 | 7/2011 | Kang et al. |
| 2011/0209690 A1 | 9/2011 | Ulrey et al. |
| 2013/0213350 A1* | 8/2013 | Watanabe et al. ............ 123/327 |

* cited by examiner

ENGINE CONTROL SYSTEM AND METHOD

BACKGROUND/SUMMARY

Engines may increase output power by using boosting devices that compress intake air. Since charge compression increases air temperature, charge air coolers may be utilized downstream of a compressor to cool the compressed air, further increasing the potential power output of the engine. As intake air passes through the charge air cooler and is cooled below a dew point, condensation occurs. The condensate may be accumulated at a trap and delivered to the engine subsequently, e.g., during steady-state or cruise conditions, at a controlled rate of ingestion. However, because the ingested water slows the rate of combustion, even small errors in the introduction of water into the engine can increase the likelihood of misfire events. Engine control systems may employ various misfire control approaches to reduce misfires causes by the ingestion of water.

One example approach for addressing moisture induced misfires is shown by Tonetti et al. in EP 1607606. Therein, an intake air flow rate is adjusted based on an oxygen concentration of recirculated exhaust gas to compensate for condensate in the EGR. Another example approach is shown by Wong et al. in U.S. Pat. No. 6,748,475. Therein, a fuel injection and spark timing is adjusted based on a parameter indicative of an oxygen concentration or water concentration of recirculated exhaust gas. This allows misfire events arising during steady-state conditions due to a sudden ingestion of too much water or condensate to be reduced. Even when the amount of water ingested is small, during a transient tip-in from steady state conditions, such as when going from low to moderate air mass flow rates to high air mass flow rates, the ingested water can cause slow combustion issues. In particular, the high mass flow rate can break the surface tension of the condensate, and release from the charge air cooler where the engine ingests it in larger quantities.

However the inventors herein have identified potential issues with such an approach. As one example, even with adjustments to intake air flow rate, fuel injection, and/or spark timing, misfires caused due to condensate ingestion during steady-state conditions may not be sufficiently addressed. Specifically, engine combustion stability during steady-state conditions may be very sensitive to the amount of condensate. Consequently, even small errors in condensate metering can lead to misfires.

In one example, some of the above issues may be addressed by a method for a boosted engine comprising: increasing airflow through a charge air cooler in response to a deceleration event. In this way, condensate can be purged without incurring misfire events.

As one example, an engine controller may deliver condensate collected at a charge air cooler to an engine during a deceleration event. For example, in response to a tip-out, when the engine is spinning un-fueled (e.g., during a deceleration fuel shut off or DFSO event), a valve coupled to the charge air cooler (or coupled between the charge air cooler and the intake manifold) may be opened so that the condensate can be introduced into the engine's intake manifold. Additionally or optionally, an intake throttle may be opened to increase airflow to the engine. By opening the valve and/or throttle during the deceleration, intake manifold vacuum generated from the spinning engine may be advantageously used to draw in the condensate. Additionally the engine could be downshifted to a lower gear, further increasing engine speed (and air mass flow rate), thereby creating additional vacuum force to evacuate the condensate.

A timing of opening the valve and/or throttle may be coordinated with a timing of the deceleration event such that the valve is opened at the same time as cylinder fueling is shut off. The valve and/or throttle may then be closed when sufficient condensate has been purged or when cylinder fueling is resumed (e.g., during a tip-in following the tip-out). In this way, by delivering condensate from a charge air cooler to an engine during a deceleration event, the large amount of intake manifold vacuum generated from the engine braking can be advantageously used to draw condensate into the engine. By delivering the condensate to the engine during conditions when cylinder combustion is not occurring, the condensate can pass through the engine system without degrading combustion stability. Further, since the condensate is introduced while no combustion is occurring, concurrent engine actuator adjustments for misfire control may not be required. Overall, a larger amount of condensate may be purged into the engine without increasing engine misfires.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
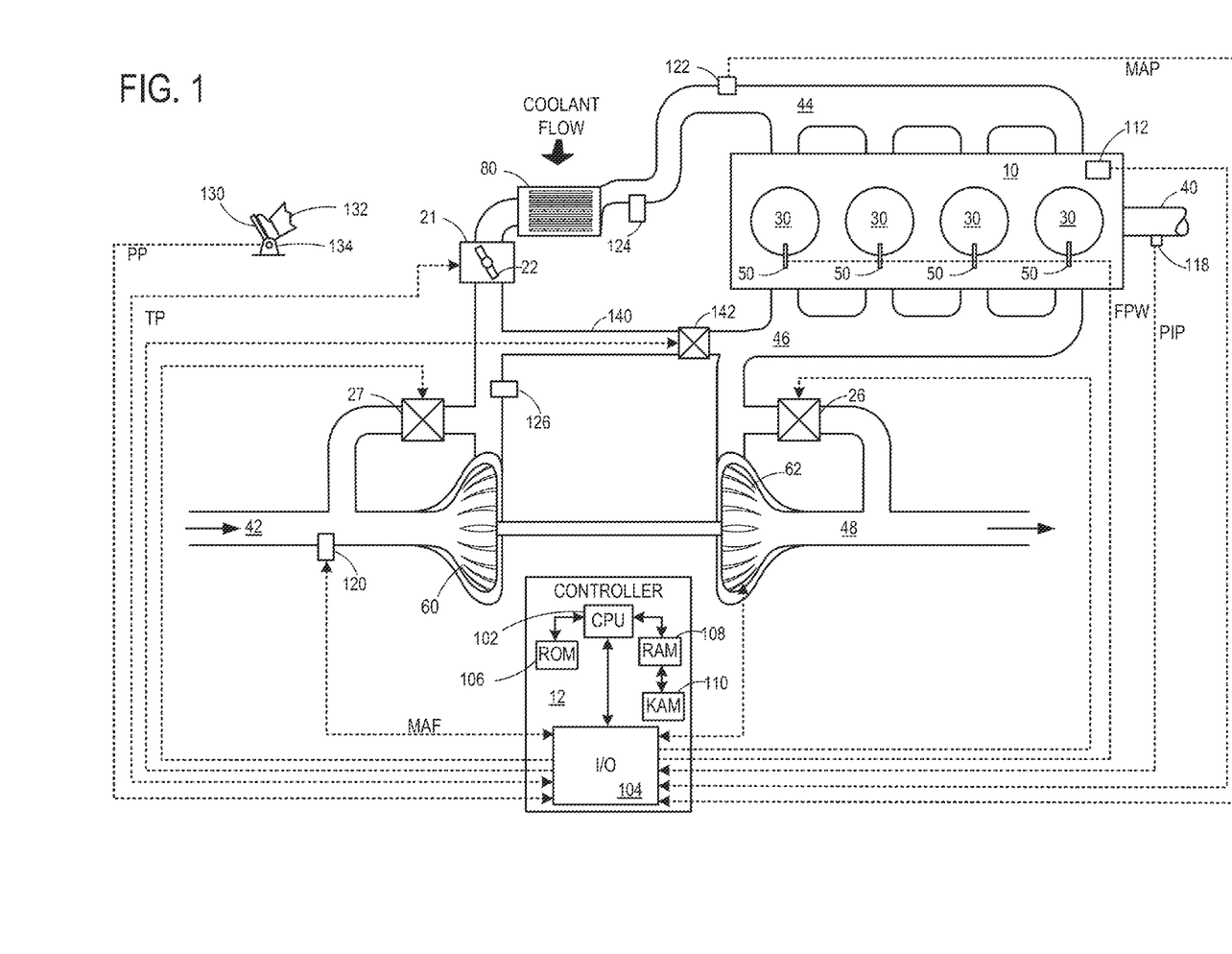
FIG. 1 is a schematic diagram of an example engine system including a charge air cooler.

The following description relates to systems and methods for purging condensate from a charge air cooler (CAC) coupled to an engine system, such as the system of FIG. 1. Condensate purging may be performed opportunistically, during engine deceleration events when fueling of an engine cylinder is temporarily stopped, such as during a tip-out condition. An engine controller may be configured to perform a control routine, such as the routine of FIG. 4, to open a valve coupled to the charge air cooler (FIGS. 2A-B and 3A-B) during a deceleration fuel shut off event to purge condensate to the engine intake during conditions when no cylinder combustion is occurring. Purge settings may be based on an amount of condensate stored at the CAC, as inferred from a model described at FIG. 5. During engine deceleration, an intake throttle opening may be temporarily increased to increase an intake air flow to the engine, further assisting in drawing the condensate into the engine. An example purging operation is shown at FIG. 6. In this way, condensate can be purged from a charge air cooler during conditions when misfire events due to water ingestion are not likely.

FIG. 1 is a schematic diagram showing an example engine 10, which may be included in a propulsion system of an automobile. The engine 10 is shown with four cylinders 30.

However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge-air-cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may be a variable volume CAC, such as shown in the embodiments of FIGS. 2A-B and 3A-B. In those embodiments, as described in more detail below, the charge air cooler 80 may include a valve to selectively modulate the amount and flow velocity of intake air traveling through the charge air cooler 80 in response to condensation formation within the charge air cooler as well as engine load conditions.

In both variable and non-variable embodiments of CAC 80, purging of stored condensate can be enabled during a deceleration event. In particular, during an engine deceleration, when fuel injection to engine cylinders is shut off, an air intake throttle may be temporarily opened with a concomitant temporary transmission gear downshift (such as a gear downshift used in towing modes to increase engine braking). For example, the transmission gear may be downshifted from a transmission third gear to a transmission first gear. By opening the intake throttle, a mass airflow through the engine can be increased, thereby increasing manifold vacuum and enabling more condensate to be drawn in. By downshifting the transmission while opening the intake throttle, an engine speed during the deceleration can be further increased, enabling the intake mass airflow to be further increased, and increasing the amount of condensate that can be purged during the deceleration event.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by processor 102 for performing the methods described below as well as other variants that are anticipated but not specifically listed. Example routines are described herein at FIGS. 4-5.

Figure 2A:
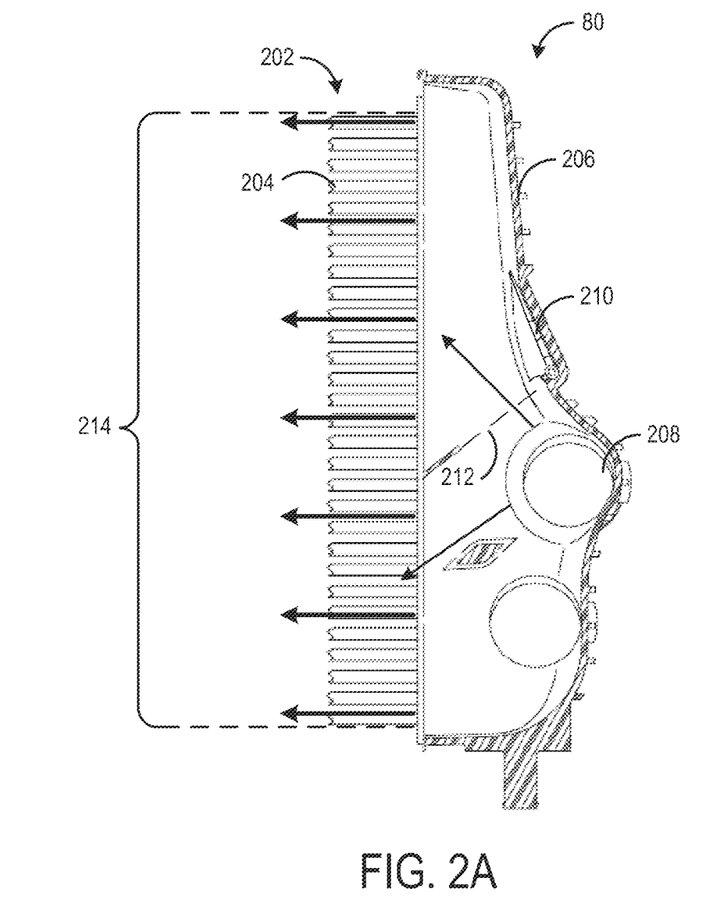
FIGS. 2A-B and 3A-B show example embodiments of a valve coupled to the charge air cooler for delivering condensate from the charge air cooler to an engine intake.
Figure 2B:
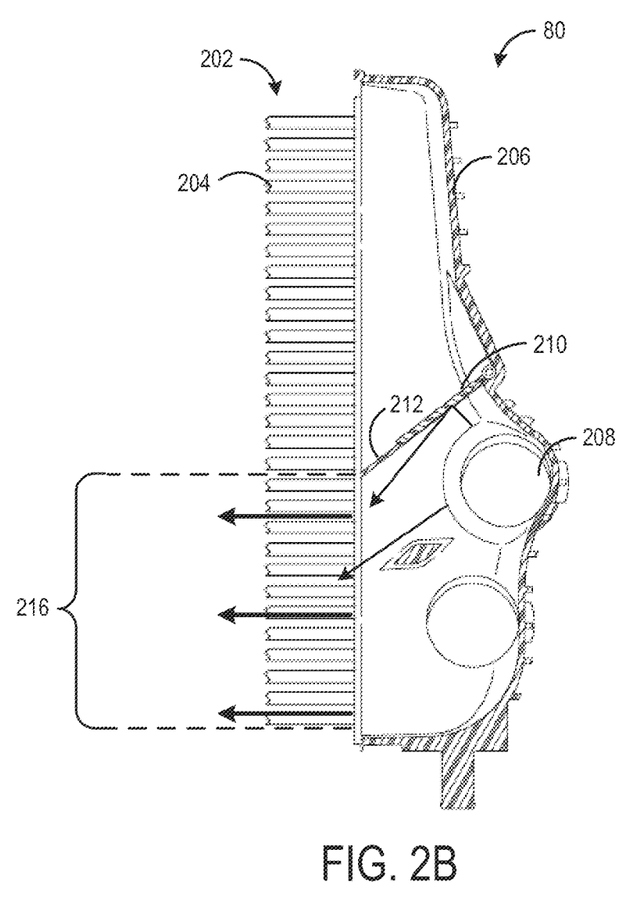

Turning now to FIGS. 2A and 2B, an inlet side of charge air cooler 80 is depicted. As depicted in both FIGS. 2A and 2B, charge air cooler 80 includes an operable thermal transfer area 202 configured to transfer heat from inside the charge air cooler 80 to outside of the charge air cooler 80. The charge air cooler 80 includes a plurality of cooling tubes 204 located in the thermal transfer area 202 of charge air cooler 80. The plurality of cooling tubes 204 are in fluidic communication with an inlet tank 206. Inlet tank 206 is configured to receive intake air via one or more inlet passages 208 coupled to an upstream region of an intake passage (not shown in FIGS. 2A and 2B). The intake air flows from the inlet tank 206 to the plurality of cooling tubes 204. After passing through the cooling tubes 204, the intake air is routed through an outlet tank (not shown) coupled to a downstream region of the intake passage.

Charge air cooler 80 may also include a charge air cooler valve 210 (CAC valve) configured to change the operable thermal transfer area from a first volume 214 (shown in FIG. 2A) comprising a relatively large area to second volume 216 (shown in FIG. 2B) comprising a relatively small area. CAC valve 210 may be configured as a flap, as shown. Inlet tank 206 may include a divider 212 that partitions inlet tank 206 into a first portion and a second portion. Divider 212 may include one or more holes. FIG. 2A depicts valve 210 in an open position. When valve 210 is open, intake air may pass through one or more holes of divider 212 such that intake air flows through both the first and second portions of inlet tank 206 and through the first volume 214 of the charge air cooler 80. Substantially all of the plurality of cooling tubes 204 may define the first volume 214. In one example, the charge air cooler 80 may include 21 cooling tubes, and the first volume 214 may include all 21 cooling tubes. FIG. 2B depicts valve 210 in the closed position. When closed, valve 210 blocks the one or more holes of divider 212. Thus, intake air only flows through the first portion of the inlet tank 206 and through the second volume 216 of the charge air cooler 80. A portion of the plurality of cooling tubes 204 may define the second volume 216. The second volume 216 is contained wholly within the first volume 214. That is, the cooling tubes that comprise the second volume 216 also comprise a portion of the first volume 214. Therefore, when valve 210 is closed, intake air flows through only the second volume 216, and when valve 210 is open, intake air flows through the first volume 214, which contains the second volume 216. In one example, the charge air cooler 80 may include 21 cooling tubes, and the second volume 216 may include less than 21 cooling tubes. The second volume 216 may include less than half the cooling tubes that comprise the first volume 214, such as 9 cooling tubes.

CAC valve 210 may be, or may be similar to, a flapper valve. The valve 210 may include a seat member (e.g., divider 212) comprising a substantially flat stationary member having one or more holes there through. A closure member, for example a flap, or plate may be configured to move a first position spaced from the seat member thereby opening the one or more holes wherein intake air is able to flow into the first volume 214, to a second position adjacent to the seat member thereby closing the one or more holes wherein intake air is able to flow into only the second volume 216.

The divider 212 may be part of the valve 210. For example, the divider 212 may be a valve seat. The divider 212 may also be a dividing line or datum, or the like, functionally dividing the charge air cooler 80 into the two portions. Some embodiments may include two or more dividers dividing the inlet into three or more portions. In some examples one or more configurations described herein regarding the inlet tank 206 may instead, or in addition, be included in an outlet tank (not shown). Substantially all of the plurality of cooling tubes 204 may be in mutual fluidic communication with the outlet tank. It will be understood that instead, all the tubes may be in fluid communication on the inlet side and divided at the outlet side into two or more portions of tubes. A similarly configured valve may also be included in the outlet tank and function to control whether the fluid is allowed to pass or prevented from passing through a similarly configured hole.

Various embodiments may include an actuator (not illustrated) to open and to close the CAC valve 210. The actuator may be one or more of: an electronic actuator, a vacuum controlled actuator, a mechanical pressure diaphragm, a pulse-width modulated electronic control. When the inlet air is allowed to pass through all the tubes of the charge air cooler, i.e. when the valve is open, the inlet air will also experience a drop in pressure and the valve will be exposed on both sides to the pressure of the incoming inlet air. In this way the actuator may only need to provide a motive force to open and to close the valve in order to change the valve from an open state to a close state, but may not need to provide force to keep the flap open or to keep the flap closed.

Thus, by modulating a position of CAC valve 210, a volume and flow rate of intake air directed through the charge air cooler can be varied. In some embodiments, the valve may be mechanically modulated based on intake air flow, e.g., the valve flap or plate may be kept closed by spring tension that is calibrated to match air flow, such that the valve flap opens under conditions of high air flow. Thus, during low air flow conditions or low engine load conditions, the valve may be closed and the intake air may be directed through the second (smaller) volume of the charge air cooler, increasing the intake air flow velocity through the cooler to prevent condensation accumulation. In comparison, during high air flow conditions or high engine load conditions, the valve may be opened and intake air may be directed through the first (larger) volume of the charge air cooler. In other embodiments, the valve may be controlled by a controller, such as controller 12 of FIG. 1, based on various operating conditions. For example, the valve may be opened during low condensation formation conditions and commanded closed during conditions of high condensation formation.

Figure 4:
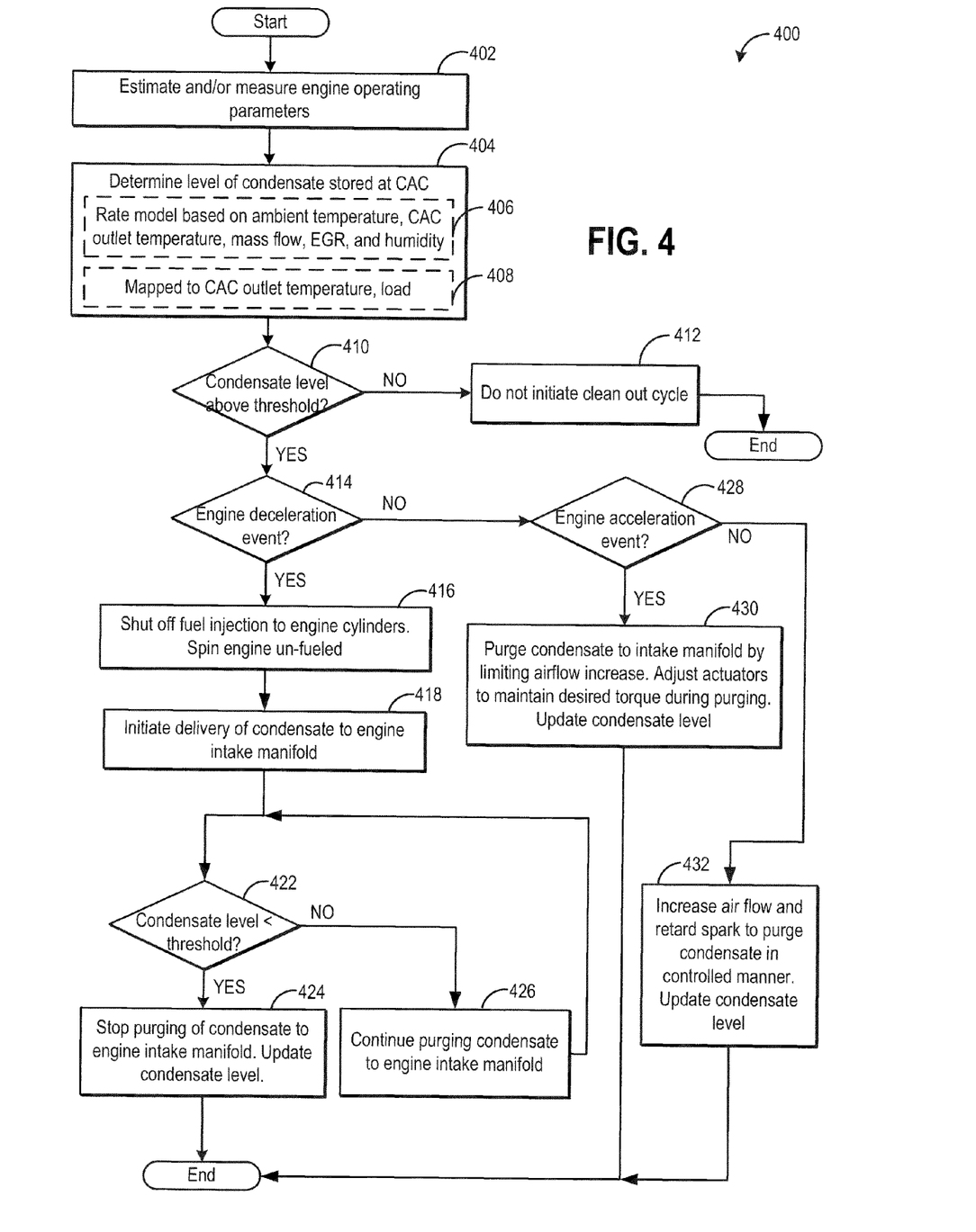
FIG. 4 shows a high level flow chart of a method for purging charge air cooler condensate to an engine intake during an engine deceleration event.

In addition, as elaborated herein at FIG. 4, an intake throttle and CAC valve 210 may be opened during a condensate purging routine to increase airflow through the CAC and thereby increase the amount of condensate purged from the CAC to the engine intake. The purging may be advantageously performed during a deceleration event (such as a DFSO) so as to ingest the water during conditions when cylinder combustion is not occurring. Alternatively, to clean the condensate during the deceleration, the CAC valve may be closed (to reduce the volume through the CAC) and an intake throttle opening may be increased to purge the smaller volume. Then, once the smaller volume has been purged, the CAC valve may be opened so that both partitions of the CAC can be cleaned. Further, while the intake throttle is opened (with the CAC valve open or closed, or in a CAC with no CAC valve), a transmission gear may be downshifted to increase engine speed and further increase air mass flow through the engine the CAC. Example purging operations that can be used for a variable volume CAC (such as shown in FIGS. 2A-B) or a non-variable volume CAC (such as shown in FIG. 1) are described herein with reference to FIG. 6.

Figure 3A:
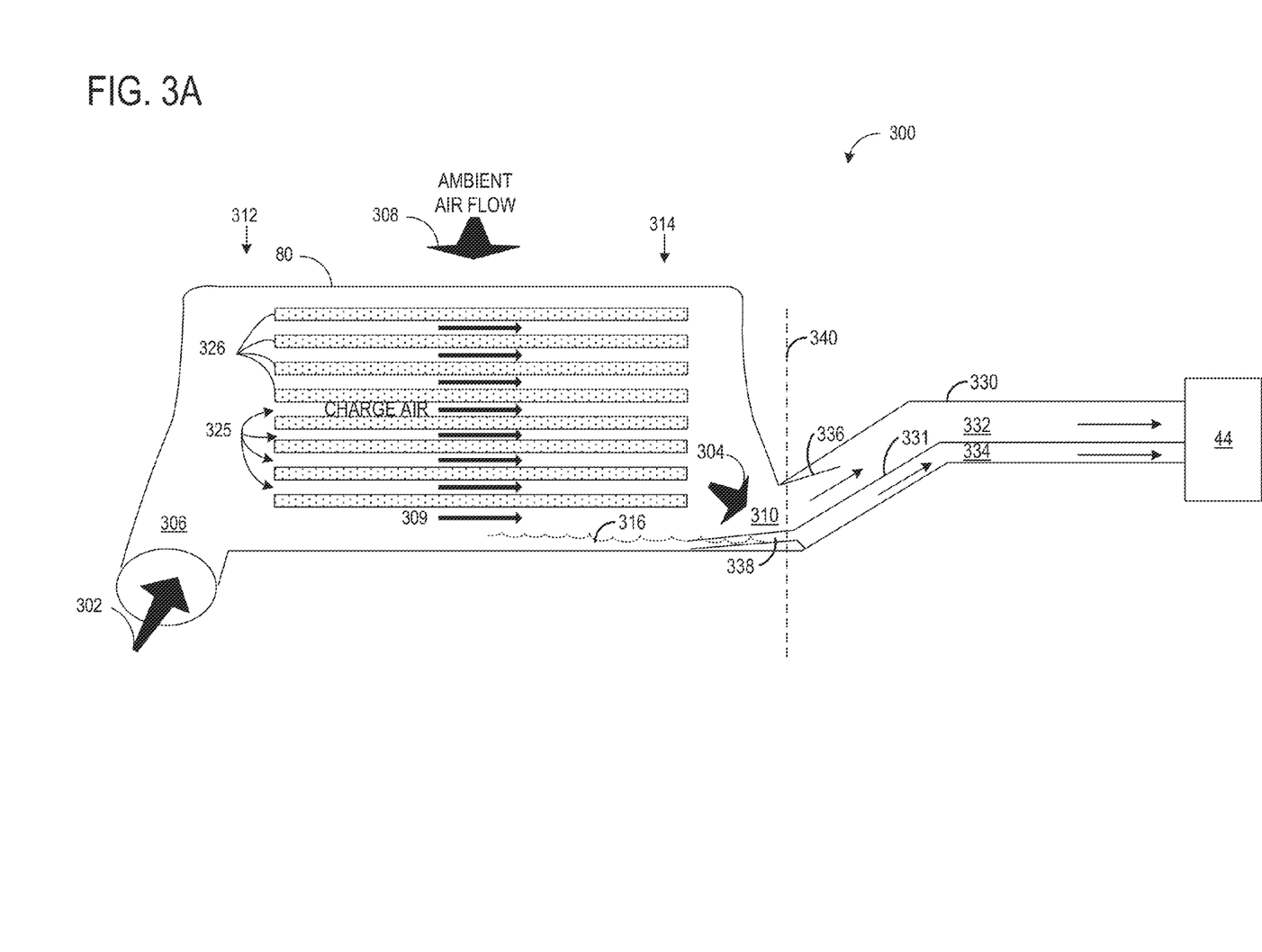
Figure 3B:
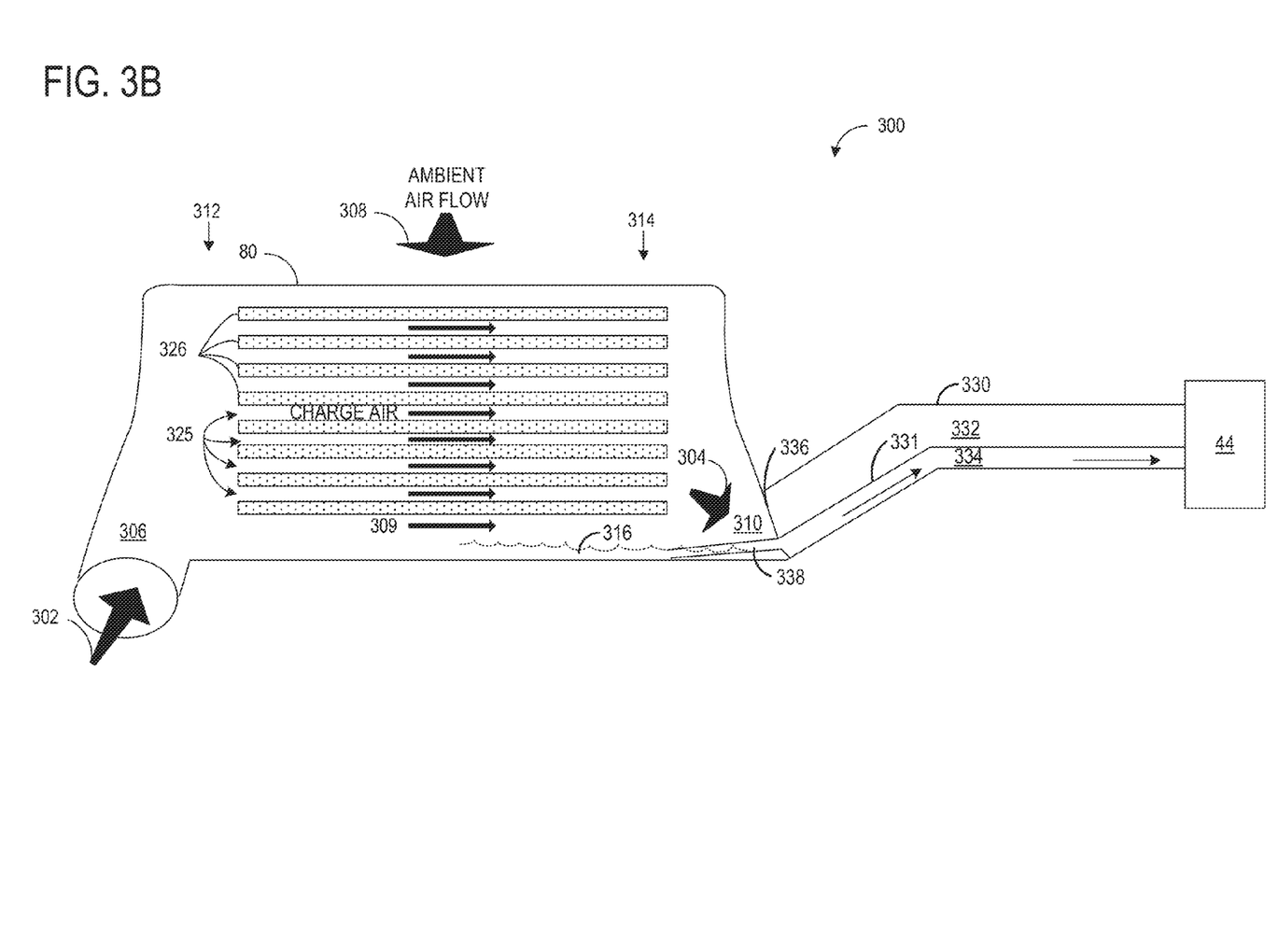

Referring now to FIGS. 3A and 3B, an alternate embodiment of a charge air cooling system is illustrated wherein the CAC includes a valve coupled between the outlet of the CAC and the intake manifold, herein also referred to as an intake manifold valve. In alternate embodiments, the valve may be coupled to an inlet of the CAC. FIGS. 3A and 3B show a front perspective view of a charge air cooler system 300 including a charge air cooler 80. The charge air cooler system may be utilized to discharge water droplets from the charge air cooler which may accumulate as the result of the high ambient air humidity. This may occur, for example, on surfaces of heat exchange passages within the charge air cooler when the surfaces are at a temperature less than the dew point of the ambient air entering the cooler. When condensation forms on these cooler surfaces it may pool at a low point of the charge air cooler, for example.

As shown, the direction of engine airflow entering charge air cooler 80 is indicated generally by arrow 302, and engine airflow exiting charge air cooler 80 is indicated generally by arrow 304. However, it will be appreciated that engine air may enter and exit charge air cooler 80 at other airflow directions and the engine airflow as indicated by arrows 302 and 304 is provided as one non-limiting example. Likewise, other charge air cooler geometries than those depicted in FIGS. 3A and 3B are possible without departing from the scope of this disclosure.

As introduced above, engine air may enter via a first engine air passage 306 upstream from charge air cooler 80. Engine air may then be cooled via heat exchange with ambient air, indicated generally at 308, and may then exit via a second engine air passage 310 downstream from charge air cooler 80. In other words, engine air enters at a hot side 312 of the charge air cooler and exits at a cold side 314 of the charge air cooler (directionality of charge air flow indicated generally by arrows 309), wherein 'hot' and 'cold' indicate a relative temperature of the engine air as it passes through the charge air cooler. In this way, ambient air 308 cools compressed engine air via heat exchange as the engine air passes through the charge air cooler. However, the compressed engine air entering the charge air cooler may condense, as described above. In this sense, first engine air passage 306 may deposit condensate within the charge air cooler.

As shown, charge air cooler 80 may include a plurality of heat exchange passages 325 and a plurality of ambient air passages 326. Heat exchange passages 325 may provide a conduit for charge air to be cooled by ambient air cross-flow passing through the plurality of ambient air passages 326. In this way, compressed engine air is cooled upstream from the combustion chambers.

Charge air cooler system 300 also includes a conduit 330 coupled to the second engine air passage 310. Conduit 330 leads to the intake manifold 44 of the engine. Thus, conduit 230 is coupled to both charge air cooler 80 and intake manifold 44. As conduit 330 is configured to deliver intake air to the engine, it may be referred to as an intake passage. Conduit 330 includes a divider 331 that portions conduit into two air flow paths, first flow path 332 and second flow path 334. Divider 331 may run the entire length of conduit 330 and act as a common interior dividing wall that is shared between the first and second flow paths. Thus, conduit 330 may be fully divided the entire length from the charge air cooler to the intake manifold, and in some embodiments, without any intervening openings. Both air flow paths are fluidically coupled to the charge air cooler 80 and to the intake manifold 44 such that charge air from the charge air cooler 80 may travel through both first flow path 332 and second flow path 334 to reach the intake manifold 44. As shown in FIGS. 3A and 3B, first flow path 332 is vertically above second flow path 334. A vertical axis 340 is depicted in FIG. 3A to illustrate the relationship between the first flow path 332 and the second flow path 334. As used herein, vertical is with respect to the ground and the wheels of the vehicle in which charge air cooling system 300 is installed. Furthermore, as depicted in FIGS. 3A and 3B, first flow path 332 has a larger cross-section diameter than second flow path 334. However, in other embodiments, second flow path 334 may have a larger diameter, or the flow paths may have equal diameters.

First flow path 332 may be selectively opened by a valve 336 positioned across the first flow path 332. As illustrated herein, valve 336 is positioned at the inlet of first flow path 332 where conduit 330 is coupled to charge air cooler 80. However, valve 336 may be positioned at other suitable locations. In one example, valve 336 may be positioned in second flow path 334 rather than first flow path 332. In another example, valve 336 may be positioned at a different location within first flow path 332, such as in the middle of conduit 330, at the outlet of the conduit 330, inlet of the intake manifold 44, etc.

Valve 336 may be a spring-loaded flapper valve configured to be closed under low to mid load conditions and opened under high load conditions. For example, the spring tension acting on valve 336 may be high enough to maintain valve 336 in a closed position when charge air velocity is relatively low (e.g., under lower load conditions). When charge air velocity is relatively high (e.g., under high load conditions), the higher velocity of the charge air acting on the spring may force the valve 336 open. FIG. 3A shows the valve 336 in the open position, with charge air flowing to the intake manifold 44 via both first flow path 332 and second flow path 334.

When closed, valve 336 may act to block first flow path 332 from receiving charge air, thus directing all charge air through second flow path 334, as shown in FIG. 3B. In doing so, the velocity of charge air traveling through the second flow path 334 increases. The increased air velocity entrains condensate that has accumulated on the bottom surface of the charge air cooler 80. For example, accumulated condensate 316 may pool at a low point of charge air cooler 80, such as along the bottom surface of charge air cooler. Accumulated condensate 316 may also pool along surfaces of the heat exchange passages 325 and/or at collections point in conduit 330 (such as bends). This condensate may be swept out of the charge air cooler under high velocity conditions, such as high load. However, during lower load conditions, the velocity of the charge air may not be high enough to move the accumulated condensate. By selectively closing off part of the flow path from the charge air cooler 80 to the intake manifold 44 with the closed valve 336 (e.g., by selectively closing off first flow path 332), the increased velocity of the charge air traveling through the second flow path 334 may remove the condensate, even during lower load conditions. During high load conditions, when charge air velocity is higher, a closed valve 336 may present a large pressure drop, hindering efficient flow. Thus, valve 336 is configured to open under high load conditions.

Also depicted in FIGS. 3A and 3B is a condensation collection tube 338. Condensation collection tube 338 may be coupled to the second flow path 334 and include an inlet positioned near a low point of the charge air cooler 80. The condensation collection tube 338 may further narrow the flow path of charge air exiting the charge air cooler 80. In this way, condensation collection tube 338 may act as a straw to funnel charge air with entrained condensate into the second flow path 334 and to the intake manifold 44.

It will be appreciated that the above description is non-limiting and components of the charge air cooler system 200 may be of other suitable geometric configurations than those depicted in FIGS. 3A and 3B. Additionally, it will be appreciated that features of charge air cooler system 300 may embody configurations other than those depicted without departing from the scope of this disclosure. For example, condensation collection tube 338 may be omitted, or it may be coupled to first flow path 332 rather than second flow path 334. Further, while valve 336 is depicted as a spring-loaded flapper valve configured to open or close based on the velocity of the charge air, other valve configurations are possible. In one example, valve 336 may be controlled by controller 12 to selectively open or close based on engine operating conditions. Valve 336 may be an on-off valve with a fully open and fully closed position, or it may be a continuously variable valve with a plurality of restriction points. Further, in alternate embodiments, the valve may be coupled to an inlet of the CAC rather than the outlet.

In another example, more than two flow paths are possible. The conduit may contain three or more flow paths, and one or more of the flow paths may be controlled via a valve as described above. Alternatively, only one flow path may be provided, and the valve may be configured as a variable position valve that can regulate the restriction level of the opening of the flow path to change the velocity of the air traveling through the conduit.

As shown in FIGS. 3A and 3B, divider 331 runs the entire length of conduit 330, from the outlet of charge air cooler 80 to in the inlet of intake manifold 44. As such, first flow path 332 and second flow path 334 share a common interior dividing wall. Further, in some embodiments, no components (other than valve 336), additional flow paths, or openings are positioned within conduit 330, and thus first and second paths 332, 334 extend from charge air cooler 80 to intake manifold 44 without interruption. However, in other embodiments, additional components may be positioned between the charge air cooler and the intake manifold, such as throttles, various sensors, another turbocharger, additional charge air cooler, etc. If additional components are present, the conduit between the charge air cooler and downstream component may include multiple flow paths while the conduit from the downstream component to the intake manifold may only include one flow path, or the conduit from the downstream component to the intake manifold may also include multiple flow paths.

Thus, by modulating a position of intake manifold valve 336, a volume and velocity of intake air directed through a conduit between the charge air cooler and the intake manifold can be varied. Thus, during low engine load conditions, the valve may be closed and the intake air may be directed through a smaller volume of the conduit, increasing the intake air flow velocity through the cooler. In comparison, during high engine load conditions, the valve may be opened and the intake air may be directed through a larger volume of the conduit, decreasing the intake air flow velocity through the cooler. In other embodiments, the valve may be controlled by a controller, such as controller 12 of FIG. 1, based on various operating conditions. For example, the valve may be open during low condensation formation conditions and commanded closed during conditions of high condensation formation.

In addition, as elaborated herein at FIG. 4, intake manifold valve 336 and an intake throttle may be opened during a condensate purging routine to increase airflow through the CAC and thereby increase the amount of condensate purged from the CAC to the engine intake. The purging may be advantageously performed during a deceleration event (such as a DFSO) so as to ingest the water during conditions when cylinder combustion is not occurring. Alternatively, to clean the condensate during the deceleration, the intake manifold valve may be closed (to increase the velocity of air through the CAC) and an intake throttle opening may be increased to purge the smaller volume. Then, once the smaller volume has been purged, the intake manifold valve may be opened so that both partitions of the CAC can be cleaned. Further, while the intake throttle is opened (with the intake manifold valve open or closed, or in a CAC with no intake manifold valve), a transmission gear may be downshifted (e.g., if a lower gear is available) to increase engine speed and further increase air mass flow through the engine the CAC. Example purging operations that can be used for a variable volume CAC (such as shown in FIGS. 3A-B) or a non-variable volume CAC (such as shown in FIG. 1) are described herein with reference to FIG. 6.

It will be appreciated that while the embodiments of FIGS. 2A-B and 3A-B show the charge air cooler with a flapper valve, in still other embodiments, the charge air cooler may not have a valve coupled thereto. In those embodiments, to enable purging of condensate during a deceleration event, an air intake throttle may be temporarily opened with a concomitant temporary transmission gear downshift (such as a gear downshift used in towing modes to increase engine braking). For example, the transmission gear may be downshifted from a transmission third gear to a transmission first gear. By opening the intake throttle and downshifting a transmission gear, a mass air flow rate though the engine and the CAC may be increased and the resulting increase in manifold vacuum can be advantageously used during the deceleration event to draw in and purge more condensate from the CAC. In one example, the temporary opening of the intake throttle during a deceleration event (such as during a DFSO) may be performed for a few seconds. As such, since the throttle opening and transmission gear downshift affects engine braking, a vehicle control system may coordinate and adjust the braking efforts of alternate vehicle brakes (e.g., wheel brakes) to maintain a desired deceleration rate. For example, while the engine braking is temporarily increased, a wheel braking effort may be temporarily decreased. As another example, in embodiments where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration).

It will be appreciated that the purging routines described herein enable condensate to be purged from various embodiments of a CAC to an engine intake during a deceleration event. These may include a variable volume CAC (such as those described at FIGS. 2A-B and 3A-B) as well as other conventional CAC embodiments, such as a non-variable volume CAC as described at FIG. 1.

Now turning to FIG. 4, an example method 400 is shown for purging condensate from a charge air cooler to an engine intake. By opportunistically purging during deceleration events when the engine is not being fueled, misfire events rising from water ingestion can be reduced.

At 402, the method includes estimating and/or measuring engine operating conditions. These may include, for example, engine speed, MAP, MAF, BP, engine temperature, catalyst temperature, ambient conditions (temperature, humidity, etc.), charge air cooler conditions (inlet temperature, outlet temperature, inlet pressure, outlet pressure, flow rate through the cooler, etc.), EGR, torque demand, etc.

At 404, the level of condensate at the charge air cooler may be determined. This may include retrieving details such as ambient air temperature, ambient air humidity, inlet and outlet charge air temperature, inlet and outlet charge air pressure, and air mass flow rate from a plurality of sensors and determining the amount of condensate formed in the CAC based on the retrieved data. In one example, at 406, and as further elaborated at the model of FIG. 5, the rate of condensate formation within the CAC may be based on ambient temperature, CAC outlet temperature, mass flow, EGR, and humidity. In another example, at 408, a condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 410, the method includes determining if the condensate level at the charge air cooler is higher than a threshold. As such, the threshold may correspond to an amount of condensate above which purging of the condensate is required to reduce misfire resulting from the slow burn rate in the engine induced by the water ingestion. If the condensate level is not above the threshold, the routine proceeds to 412 wherein a clean-out cycle (or condensate purging routine) is not initiated.

Upon confirming that condensate levels are sufficiently high to necessitate purging, at 414, the routine includes confirming if there is an engine deceleration event. In one example, the engine deceleration event may include a tip-out (that is, where the operator has released an accelerator pedal and requested a decrease in torque). If an engine deceleration event is confirmed, than at 416, the routine includes shutting off fuel injection to the engine cylinders and spinning the engine un-fueled. Herein, the engine may continue to be spun via the vehicle wheels. Thus, the deceleration event includes a DFSO event following the tip-out.

At 418, in response to the engine deceleration event, delivery of condensate from the charge air cooler (CAC) to the engine intake may be initiated by increasing airflow through the CAC (and engine) in response to the deceleration event. In particular, airflow is increased while engine cylinder fuel injection is deactivated, while the engine is spinning, and while cylinder valves are still active.

As one example, this may include opening a valve or flap coupled to the charge air cooler (herein also referred to as a CAC valve) while also opening an intake throttle to release condensate from the CAC into the engine intake manifold. As another example, a valve or flap coupled in a conduit between the outlet (or inlet) of the charge air cooler and the engine intake manifold (herein also referred to as an intake manifold valve) may be opened while also opening the intake throttle to release condensate from the CAC into the engine intake manifold. In either case, by opening the valve, an intake manifold vacuum generated by the spinning engine may be used to draw in condensate from the CAC into the engine along the intake manifold.

In still another example, increasing the airflow to the engine and the CAC includes opening an air intake throttle (such as in embodiments of a CAC that does not have a variable volume), or increasing the opening of an air intake throttle, to increase mass airflow rate through the CAC and engine, thereby assisting in the purging of condensate to the intake manifold. As referred to herein, the air intake throttle may refer to an intake throttle positioned in the intake manifold downstream of a compressor (such as intake throttle 21 of FIG. 1). By increasing the air flow to the engine, engine spinning may be maintained, an intake manifold vacuum may be increased, and more condensate may be purged during the deceleration.

In one example, the air intake throttle may be maintained in the open position (e.g., the fully open position) during the purging. In another example, the opening of the throttle and the increasing airflow is adjusted further responsive to an amount of condensate stored in the CAC. For example, the opening of the intake throttle may be increased as the amount of condensate in the CAC exceeds a threshold amount. In addition, the increasing airflow can be continued for a duration until the amount of condensate in the CAC is below the threshold amount. In a further example, an opening of the throttle may be adjusted during the purging based on an engine speed to maintain a threshold amount of intake vacuum for the purging. Thus, as the engine speed decreases during the deceleration event, an opening of the intake throttle may be (further) increased to maintain the threshold vacuum. As such, once the engine speed drops below a threshold, below which further throttle adjustments may not maintain the intake manifold vacuum, throttle adjustments and further condensate purging may be discontinued.

It will be appreciated that in some embodiments, where the CAC does not include a CAC valve or an intake manifold valve, the intake throttle may be opened (instead of being closed) during the deceleration event in response to the CAC condensate level being higher than the threshold level. Additionally, during the intake throttle opening, a transmission gear downshift may be performed (eg., from a transmission third gear to a transmission first gear). By opening the intake throttle and downshifting a transmission gear, a mass air flow rate though the engine and the CAC may be temporarily increased during the deceleration event to draw in and purge more condensate from the CAC. In one example, the temporary opening of the intake throttle during a deceleration event (such as during a DFSO) may be performed for a few seconds. As such, since the throttle opening and transmission gear downshift affects engine braking, a vehicle control system may coordinate and adjust the braking efforts of alternate vehicle brakes (e.g., wheel brakes) to maintain a desired deceleration rate. As such, during a CAC purging routine that occurs during deceleration with the fuel shut off, when the intake throttle is opened to increase mass air flow rate, the vehicle may not get sufficient engine braking, and therefore a brake effort may need to be applied in order to maintain the desired deceleration rate typically present when there is closed throttle engine braking. For example, in embodiments where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration).

In still further embodiments, where the CAC does include a CAC valve or an intake manifold valve, the intake throttle may be opened during the deceleration event in response to the CAC condensate level being higher than the threshold level while the CAC valve or intake manifold valve is maintained closed, for a duration. For example, to clean the condensate during the deceleration, the CAC valve may be closed to reduce the volume of the CAC, and the intake throttle opening may be increased to increase air flow through the engine and CAC, thereby enabling purging of the smaller volume of the CAC. Then, once the smaller volume has been sufficiently purged, with the intake throttle maintained open, the CAC valve may be opened so that the (larger volume of) the CAC can be completely cleaned.

As yet another example, to clean the condensate during the deceleration, the intake manifold valve may be closed to reduce the volume of a conduit coupled between the CAC and the intake manifold. In doing so, the volume of purging at the CAC is decreased and the airflow velocity through the conduit is increased. At the same time, the intake throttle opening may be increased to purge the smaller volume. Then, once the smaller volume has been sufficiently purged, the intake manifold valve may be opened so that the CAC can be completely cleaned.

In this way, while increasing the opening of the intake throttle, a valve coupled to the charge air cooler (the CAC valve or the intake manifold valve) may be maintained closed to reduce a purge volume of the charge air cooler. Then, after purging the reduced volume of the charge air cooler, the valve may be opened.

Next at 422, it may be determined if the condensate level has dropped to below the threshold level. That is, it may be determined if the CAC has been sufficiently purged. If yes, then at 424, the routine includes stopping purging of condensate from the CAC to the intake manifold by closing the CAC valve or the intake manifold valve. After completing the purging, the condensate level at the CAC may be updated. Else, if the condensate level has not dropped below the threshold level, the routine may continue purging condensate to the engine intake manifold at 426.

It will be appreciated that in further embodiments, the purging during the deceleration event may also be stopped in response to a resuming of engine cylinder fueling. For example, in response to a sudden increase in torque demand (e.g., a tip-in, or the vehicle reaching an uphill segment), cylinder fueling may be resumed and the purging during a DFSO event may be stopped. In one example, if purging has not been completed and the vehicle driver tips in, further purging may be discontinued. The controller may initiate an alternate purging routine to enable completion of condensate purging during an engine acceleration event, as elaborated below. Alternatively, if the engine speed drops below a threshold speed during the deceleration (e.g., due to a corresponding drop in vehicle speed), such that insufficient manifold vacuum is available for purging the condensate, the CAC valve or intake manifold valve may be closed to stop purging condensate. In one example, if purging has not been completed and the engine has spun to rest, further purging may be discontinued. In still a further embodiment, as the engine speed changes (e.g., decreases) during the deceleration, the intake throttle opening may be adjusted (e.g., increased) to maintain a threshold amount of intake manifold vacuum for the purging operation. Then, when throttle adjustments cannot be used to provide the threshold intake manifold vacuum, the purging may be stopped. As an example, the increasing airflow may be continued for a duration until an earlier of the amount of condensate in the charge air cooler is below the threshold and fuel injection to the deactivated cylinder is resumed. In each case, after stopping the purging, the condensate level at the CAC may be updated. Alternatively, the CAC level can be updated as the purging happens. For example, the controller may characterize the mass of water purged as a function of the air mass flow rate. Then, at each execution of the software task loop (the purging routine), the water level can be integrated down by the amount cleansed. A hysteresis may be added to the purge cycle threshold so that the routine is not exited until adequate purging has been performed.

Returning to 414, if an engine deceleration event is not confirmed, the routine proceeds to 428 to confirm an engine acceleration event. In one example, the engine acceleration event may include a tip-in (that is, where the operator has applied the accelerator pedal and requested an increase in torque). In response to the engine acceleration event being confirmed while condensate levels at the CAC are higher than the threshold (and require purging), at 430, the routine includes opportunistically using the increased airflow during the tip-in to purge condensate from the CAC. The purging may be performed while limiting an airflow increase and maintaining the desired torque during purging by adjusting one or more engine actuators (e.g., spark timing, VCT, etc.). Then, following the purging, the condensate level at the CAC may be updated. As such, during the acceleration event, the CAC valve or intake manifold valve may be opened based on engine load conditions with the valve opened at higher engine loads and the valve closed at lower engine loads.

As such, by delivering condensate from a charge air cooler to an engine during a deceleration event, the large amount of intake manifold vacuum generated from the engine braking can be advantageously used to draw condensate into the engine. Further, by delivering the condensate to the engine during conditions when cylinder combustion is not occurring, the condensate can pass through the engine system without degrading combustion stability. Further still, since the likelihood of poor combustion or misfire due to water ingestion is reduced by purging the condensate while no combustion is occurring, concurrent engine actuator adjustments for misfire control may not be required. As such, this may enable a larger amount of condensate to be purged into the engine. In one example, a larger amount of condensate may be purged per cycle during the deceleration event (e.g., during a tip-out) as compared to the amount of condensate purged per cycle during the acceleration event (e.g., during a tip-in).

If neither an engine deceleration event nor an engine acceleration event is confirmed (that is, there is neither a tip-in or a tip-out), then at 432, the routine includes performing a pro-active charge air cooler clean-out routine. Therein, airflow through the CAC is actively increased (by opening an intake air throttle) and one or more engine operating parameters are concomitantly adjusted to maintain torque demand. Herein, the increased airflow is specifically used to purge condensate from the CAC. Thus, while increasing the airflow, one or more engine actuators (e.g., spark timing, VCT, alternator load, etc.) are simultaneously adjusted to reduce engine torque, thereby compensating for the increased torque resulting from the increased airflow. In this way, the pro-active clean-out routine allows the condensate to be purged in a controlled manner from the CAC. In one example, an amount of condensate purged per cycle during the pro-active clean-out routine may be smaller than the amount of condensate purged per cycle during each of the deceleration event and the acceleration event. Then, following the purging, the condensate level at the CAC may be updated.

In this way, during engine deceleration with fuel injection to an engine cylinder deactivated, airflow through a charge air cooler can be increased based on an amount of condensate stored in the charge air cooler. By increasing airflow through the engine during a deceleration when the amount of condensate stored in the charge air cooler is higher, a large amount of condensate can be advantageously drawn in to the intake manifold during non-combustion cylinder conditions enabling purging to be accomplished with reduce risk of misfires and knock events. In comparison, during a deceleration when the amount of condensate stored in the charge air cooler is lower, airflow through the engine may be decreased.

Figure 5:
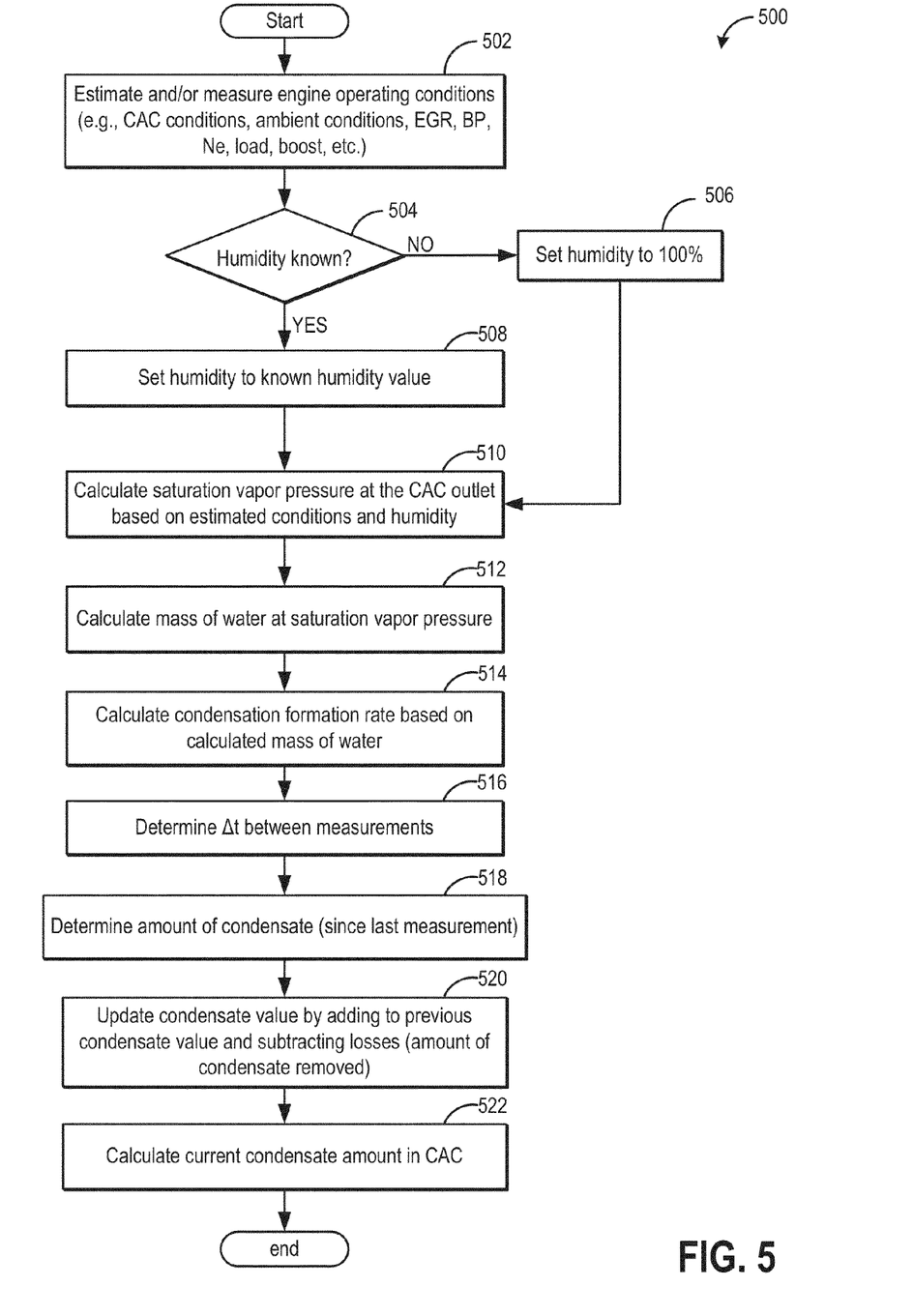
FIG. 5 shows a flow chart illustrating a method for inferring a condensate level at the charge air cooler.
Figure 6:
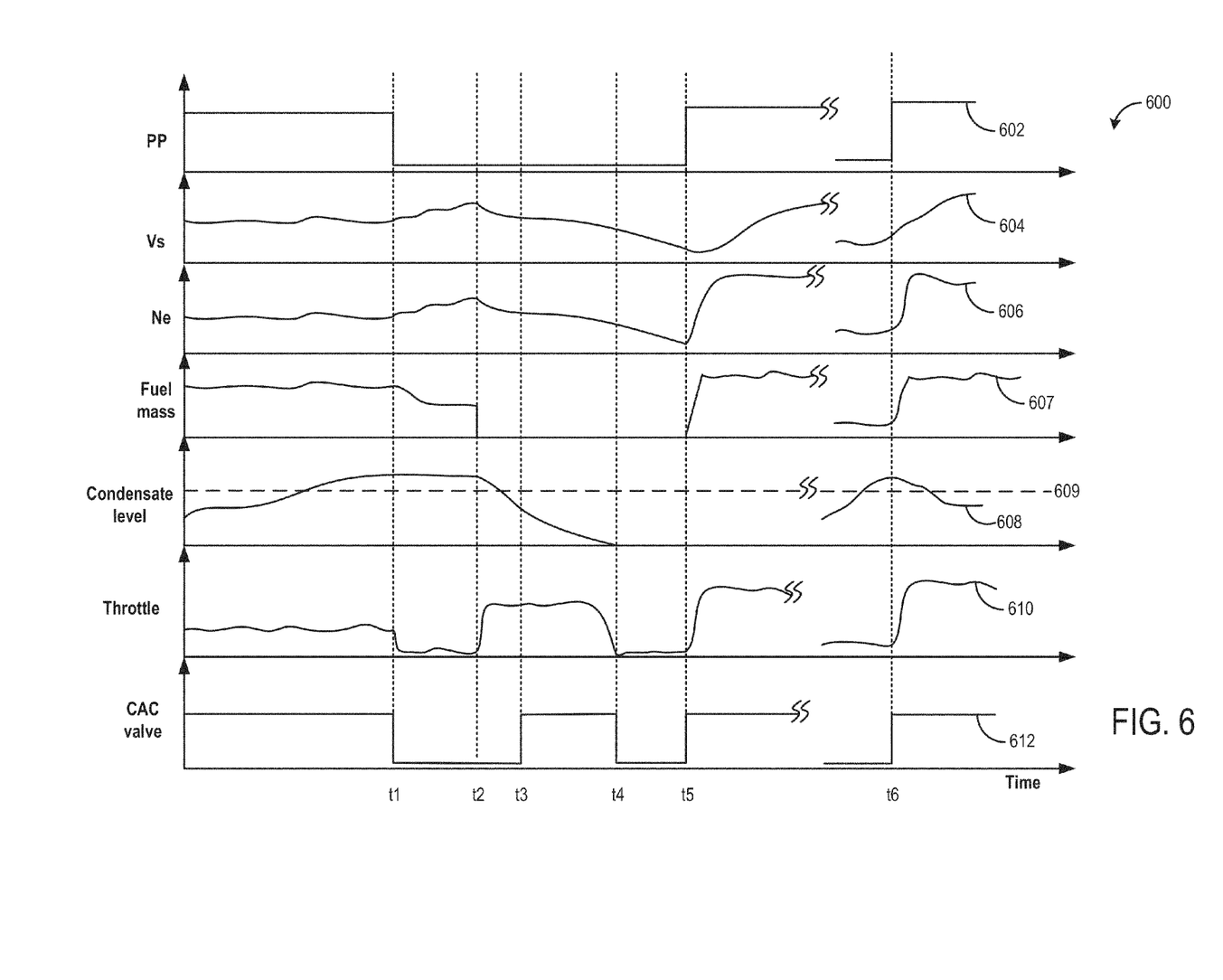
FIG. 6 shows example condensate purging operations.

FIG. 5 illustrates a method 500 for estimating the amount of condensate stored within a CAC. Based on the amount of condensate at the CAC relative to a threshold value, condensate purging routines, such as those discussed at FIG. 4, may be initiated.

The method begins at 502 by determining the engine operating conditions. These may include ambient conditions, CAC conditions (inlet and outlet temperatures and pressures, flow rate through the CAC, etc.), mass air flow, MAP, EGR flow, engine speed and load, engine temperature, boost, etc. Next, at 504, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 506. However, if the humidity is known, the known humidity value, as provided by the humidity sensor, may be used as the humidity setting at 508.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 510, an algorithm may calculate the saturation vapor pressure at the CAC outlet as a function of the CAC outlet temperature and pressure. The algorithm then calculates the mass of water at this saturation vapor pressure at 512. Finally, the condensation formation rate at the CAC outlet is determined at 514 by subtracting the mass of water at the saturation vapor pressure condition at the CAC outlet from the mass of water in the ambient air. By determining the amount of time between condensate measurements at 516, method 500 may determine the amount of condensate within the CAC since a last measurement at 518. The current condensate amount in the CAC is calculated at 522 by adding the condensate value estimated at 518 to the previous condensate value and then subtracting any condensate losses since the last routine (that is, an amount of condensate removed. for example, via purging routines) at 520. Condensate losses may be assumed to be zero if the CAC outlet temperature was above the dew point. Alternatively, at 520, the amount of condensate removed may be modeled or determined empirically as a function of air mass and integrated down with each software task loop (that is, with each run of routine 500).

As such, the method of FIG. 5 may be used by the controller during the routine of FIG. 4 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 4 (at 408), and updated thereafter.

Now turning to FIG. 6, map 600 shows an example condensate purging operation during acceleration and deceleration events. Specifically, map 600 shows a change in pedal position (PP) indicative of an operator torque demand at plot 602, a corresponding change in vehicle speed is shown at plot 604, and a corresponding change in engine speed is shown at plot 606. Plot 607 depicts a change in engine mass fuel. Further, changes to a CAC condensate level are shown at plot 608, changes to an air intake throttle position are shown at plot 610, and changes to the position of a CAC valve of the CAC are shown at plot 612. While plot 612 of the depicted example is shown with reference to a CAC valve, such as the valve of FIGS. 2A-B, in an alternate embodiment, the same adjustments may be performed with reference to an intake manifold valve, such as the valve of FIGS. 3A-B. Further, the same operations may be performed in embodiments of a CAC not including a valve for varying a volume of the CAC.

Prior to t1, a vehicle operator may have applied the accelerator pedal to request torque and vehicle speed (plot 606). Accordingly, a pedal position may be higher than a threshold (plot 602), and an engine speed may be elevated to provide the desired torque (plot 604) and desired vehicle speed. During this time, in response to the engine load being higher than a threshold, a CAC valve may be opened to allow air to flow through the CAC. However, even with the CAC valve open, condensate level may be gradually increasing (plot 608) and shortly before t1, the condensate level may increase above threshold level 609, indicating a need for CAC condensate purging.

At t1, a tip-out event may occur, as indicated by the drop in pedal position. In response to the tip-out, the intake air throttle opening may be initially decreased (or closed) to reduce air flow through the engine. The engine speed may track the vehicle speed. In response to the drop in engine load, the CAC valve may be closed to reduce airflow through the CAC. At t2, the vehicle may start decelerating. In response to the reduced torque demand during the deceleration, fuel injection to engine cylinders may be shut off. That is, a deceleration fuel shut off (DFSO) operation may be performed. Due to the DFSO event, an engine fuel mass may decrease (plot 607). Also, as a result of the DFSO event, engine braking may be enabled.

As such, in response to the deceleration event, intake airflow may be reduced and maintained at the reduced level until increased torque is subsequently demanded by the vehicle operator (e.g., due to a tip-in following the deceleration event). However, in the present example, in response to the condensate level being higher than the threshold during the DFSO event, at t2, an opening of the intake throttle may be increased (e.g., the throttle may be fully opened) while the CAC valve is closed to enable purging of the condensate from the CAC into the engine intake. In particular, by closing the CAC valve, a volume of the CAC is decreased while at the same time, by opening the intake throttle, an airflow through the engine and the CAC is increased. This allows condensate stored in the smaller volume of the CAC to be rapidly purged between t2 and t3 (e.g., in a couple of seconds). At t3, once purging of the smaller volume of the CAC is completed, the CAC valve may be opened while the intake throttle is maintained open to allow the rest of the CAC to be purged during the DFSO event. At t4, purging of the CAC may be considered complete in response to the condensate level being below the threshold level. In response to the purging being completed while deceleration conditions are still present, the intake throttle may be closed to reduce airflow. In addition, the CAC valve may be closed to reduce airflow through the CAC during the low load condition.

In this way, during the deceleration event, the CAC valve may be opened and closed, with the opening and closing of the CAC valve based at least on the amount of condensate in the charge air cooler (and independent of the engine load). In addition, since the purging occurs while no cylinder combustion is occurring, concomitant engine actuator adjustments required for misfire control are not required. For example, a spark timing may be maintained.

It will be appreciated that while the example in the depicted figure shows the throttle maintained open between t2 and t4, in alternate embodiments, an opening of the throttle may be dynamically adjusted between t2 and t4 based on the change in engine speed to maintain an amount of intake manifold vacuum for sufficient purging of condensate from the CAC into the engine intake. It will also be appreciated that in some embodiments, the throttle opening may be increased while a transmission gear is downshifted (not shown) to increase an intake mass airflow and engine speed. As such, if a concomitant gear downshift is performed, a relatively higher increase in engine speed may be observed (not shown). By increasing airflow through the engine and CAC, purging efficiency is increased. As such, between t2 and t4 of the deceleration event, when engine braking is used to slow the vehicle, alternate vehicle braking efforts may be adjusted to maintain a desired deceleration rate. For example, a vehicle control system may coordinate and adjust the braking efforts of alternate vehicle brakes (e.g., wheel brakes) to maintain the desired deceleration rate. For example, in embodiments where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration).

At t5, the vehicle operator may tip-in, as indicated by the sudden increase in pedal position. In response to the tip-in, the intake throttle may be opened to provide the desired airflow and meet the torque demand. In addition, an engine speed and vehicle speed may increase. As such, during an acceleration event, an opening and closing of the CAC valve is based on the engine load. Therefore, in response to the high load condition at the tip-in, the CAC valve may be reopened. While the valve is open, the increased airflow of the tip-in can be advantageously used to purge at least some condensate from the CAC (or reduce accumulation of condensate at the CAC), even though condensate levels at the CAC are not sufficiently high to need an active purging routine.

A second later tip-in occurring after an amount of time has elapsed is shown at t6. Herein, during the second later tip-in, the condensate levels at the CAC may be sufficiently high and an active purging routine may be requested. Herein, in response to the tip-in, the intake throttle opening may be increased to provide increased airflow. The increased airflow may then be advantageously used to purge condensate from the CAC to the intake. In particular, the CAC valve may be opened while the throttle is open to rapidly purge the stored condensate. In addition, one or more alternate engine operating parameters (not shown) may be adjusted to maintain the desired torque. For example, while the condensate is being purged to the intake during the tip-in, a spark ignition timing may be advanced, or an amount of retard may be limited. In one example, the controller may meter the amount of ingested water by limiting or shaping the response of the air mass inducted curve. A spark timing adjustment may then be used to maintain combustion timing (e.g. to avoid late burns).

Thus, during a first condition, as shown at t6, when intake air flow is higher than a threshold flow, condensate is delivered from a charge air cooler to an engine during an engine acceleration event. Then, during a second condition, as shown at t2, when intake vacuum is higher than a threshold vacuum, condensate is delivered from the charge air cooler to the engine during an engine deceleration event. Herein during the first condition, a first smaller (net) amount of condensate is delivered and during the second condition, a second larger (net) amount of condensate is delivered to the engine intake. Further, during the first condition, fuel is injected to engine cylinders during the delivering of condensate while during the second condition, fuel is not injected to engine cylinders during the delivering. Further, during the first condition, an intake throttle opening is increased based on a pedal position to increase air flow, while during the second condition, the intake throttle opening is increased based on a condensate level at the charge air cooler and an engine speed to increase intake manifold vacuum. Likewise, during the first condition, opening of a valve coupled to the charge air cooler is based on an engine load, while during the second condition, opening of the valve coupled to the charge air cooler is based on a condensate level at the charge air cooler. Further still, during the first condition, spark ignition timing is advanced while during the second condition, spark ignition timing is maintained. In this way, condensate stored in a charge air cooler can be purged to an engine intake during a deceleration event. By increasing airflow through the engine intake manifold and the charge air cooler during the deceleration event, misfires occurring due to ingestion of water into an engine and a resulting slow burn can be reduced. In particular, by drawing in the condensate during conditions when engine cylinders are not combusting, misfires as well as issues related to degraded combustion stability are reduced. Further, concurrent engine actuator adjustments otherwise needed for misfire control may not be required. As such, this allows a larger amount of condensate to be purged into the engine without increasing engine misfires.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for a boosted engine, comprising:
    in response to a deceleration event, increasing airflow through a charge air cooler until an amount of condensate stored in the charge air cooler is below a threshold.

2. The method of claim 1, wherein increasing airflow in response to the deceleration event includes increasing airflow while engine cylinder fuel injection is deactivated, while the engine is spinning, and while cylinder valves are still active.

3. The method of claim 1, wherein increasing airflow includes increasing an opening of an intake throttle.

4. The method of claim 3, wherein the opening of the intake throttle is adjusted based on an engine speed to maintain a threshold amount of intake manifold vacuum.

5. The method of claim 1, wherein increasing airflow includes opening one of a valve coupled to the charge air cooler, a valve coupled between an outlet of the charge air cooler and an engine intake manifold, and a valve coupled between an inlet of the charge air cooler and an air intake passage.

6. The method of claim 1, wherein increasing airflow includes increasing an opening of an intake throttle for a duration while closing a valve coupled to the charge air cooler to reduce a volume of the charge air cooler that is purged, and after the duration, maintaining the intake throttle open while opening the valve coupled to the charge air cooler.

7. The method of claim 1, wherein the deceleration event includes a tip-out.

8. A method for a boosted engine, comprising:
    during engine deceleration with fuel injection to an engine cylinder deactivated, increasing airflow through a charge air cooler based on an amount of condensate stored in the charge air cooler, the increasing airflow including increasing an opening of an intake throttle as the amount of condensate in the charge air cooler exceeds a threshold amount, the increasing airflow continued for a duration of the engine deceleration until an earlier of the amount of condensate in the charge air cooler is below the threshold amount and fuel injection to the deactivated engine cylinder is resumed.

9. The method of claim 8, wherein the opening of the intake throttle is further adjusted based on an engine speed to maintain a threshold amount of intake manifold vacuum.

10. The method of claim 8, wherein increasing airflow through a charge air cooler further includes opening a valve coupled to an inlet of the charge air cooler or a valve coupled between an outlet or inlet of the charge air cooler and an engine intake manifold.

11. The method of claim 8, wherein increasing airflow through a charge air cooler further includes,
    while increasing the opening of the intake throttle, maintaining a valve coupled to the charge air cooler closed to reduce a volume of the charge air cooler that is purged; and
    after purging the reduced purge volume of the charge air cooler, opening the valve.

12. A method for an engine, comprising:
    delivering a first smaller amount of condensate from a charge air cooler to an engine during an engine acceleration event, when intake air flow is higher than a threshold flow; and
    delivering a second larger amount of condensate from the charge air cooler to the engine during an engine deceleration event, when intake vacuum is higher than a threshold vacuum.

13. The method of claim 12, wherein fuel is injected to engine cylinders while delivering condensate during the engine acceleration event, and wherein fuel is not injected to engine cylinders while delivering condensate during the engine deceleration event.

14. The method of claim 12, wherein an intake throttle opening is increased based on a pedal position to increase air flow during the engine acceleration event, and wherein the intake throttle opening is increased based on a condensate level at the charge air cooler and an engine speed to increase intake manifold vacuum during the engine deceleration event.

15. The method of claim 12, wherein spark ignition timing is advanced during the engine acceleration event and spark ignition timing is maintained during the engine deceleration event.

* * * * *